(12) United States Patent
Orlov

(10) Patent No.: US 11,267,207 B2
(45) Date of Patent: Mar. 8, 2022

(54) TOOLING DEVICE AND METHOD FOR PRODUCING A PLANAR STRUCTURAL COMPONENT FOR AN AIRCRAFT

(71) Applicant: Airbus Operations GmbH, Hamburg (DE)

(72) Inventor: Dimitri Orlov, Hamburg (DE)

(73) Assignee: Airbus Operations GmbH

( * ) Notice: Subject to any disclaimer, the term of this patent is extended or adjusted under 35 U.S.C. 154(b) by 253 days.

(21) Appl. No.: 16/534,244

(22) Filed: Aug. 7, 2019

(65) Prior Publication Data
US 2020/0055264 A1 Feb. 20, 2020

(30) Foreign Application Priority Data
Aug. 16, 2018 (DE) ................... 10 2018 213 778.1

(51) Int. Cl.
| B29C 70/00 | (2006.01) |
| B29C 70/44 | (2006.01) |
| B29L 31/30 | (2006.01) |
| B29K 105/08 | (2006.01) |
| B29K 101/12 | (2006.01) |

(52) U.S. Cl.
CPC .......... *B29C 70/44* (2013.01); *B29K 2101/12* (2013.01); *B29K 2105/0872* (2013.01); *B29L 2031/3082* (2013.01)

(58) Field of Classification Search
CPC .......... B29C 70/00; B29C 70/40; B29C 70/44
See application file for complete search history.

(56) References Cited

U.S. PATENT DOCUMENTS

| 4,657,717 | A |   | 4/1987 | Cattanach et al. |
| 9,144,959 | B1 | * | 9/2015 | Rotter ............... B29C 66/81455 |
| 2016/0089866 | A1 | * | 3/2016 | Garcia Martin .... B32B 38/1825 |
|  |  |  |  | 156/161 |
| 2018/0281319 | A1 | * | 10/2018 | Sebastian ............ B32B 37/1027 |

FOREIGN PATENT DOCUMENTS

DE 102015117857 A1 4/2017

* cited by examiner

*Primary Examiner* — Jacob T Minskey
*Assistant Examiner* — Matthew Hoover
(74) *Attorney, Agent, or Firm* — Lerner, David, Littenberg, Krumholz & Mentlik, LLP

(57) ABSTRACT

A tooling device for producing a planar structural component for an aircraft has a moulding tool part with a contour surface for receiving a planar semi-finished product, a heating device for heating the semi-finished product, a film produced from an elastically deformable material and a clamping system with a first clamping device arranged on a first longitudinal side of the contour surface, and a second clamping device arranged on a second longitudinal side of the contour surface located opposite the first longitudinal side. The film is couplable to the clamping devices by the edge regions thereof and, when it is coupled to the clamping devices, covers the contour surface of the moulding tool part. The film is elastically deformable relative to the contour surface by the first and/or the second clamping device to press the semi-finished product in a planar manner against the contour surface for deforming purposes.

8 Claims, 2 Drawing Sheets

TOOLING DEVICE AND METHOD FOR PRODUCING A PLANAR STRUCTURAL COMPONENT FOR AN AIRCRAFT

FIELD OF THE INVENTION

The present invention relates to a tooling device and to a method for producing a planar structural component for an aircraft.

BACKGROUND OF THE INVENTION

When being assembled, aircraft are composed, in part, from large prefabricated modules. Large structural components which extend in a planar manner are required in particular for constructing the fuselage, for example in order to be able to assemble an outer skin of the aircraft from a few individual parts.

Such planar structural components are usually produced from semi-finished products which are formed from a thermoplastic material. To this end, the semi-finished product is placed between a first moulding tool part, which comprises a first contour surface corresponding to the desired form of the structural components to be produced, and a second moulding tool part, which comprises a second contour surface which is formed in a complementary manner to the first contour surface, and the moulding tool parts are pressed together under the introduction of heat into the semi-finished product in order to deform the semi-finished product thermoplastically to produce the structural component.

BRIEF SUMMARY OF THE INVENTION

Aspects of the present invention may provide an improved concept for producing planar structural components for an aircraft.

According to a first aspect of the invention, a tooling device is provided for producing a planar structural component for an aircraft. The tooling device includes a moulding tool part which comprises a contour surface for receiving a planar semi-finished product, a heating device for heating the planar semi-finished product, a film produced from an elastically deformable material and a clamping system with a first clamping device, which is arranged on a first longitudinal side of the contour surface of the moulding tool part, and a second clamping device, which is arranged on a second longitudinal side of the contour surface of the moulding tool part located opposite the first longitudinal side. A first edge region of the film is couplable to the first clamping device and a second edge region of the film is couplable to the second clamping device. The film, when it is coupled to the clamping devices, covers the contour surface of the moulding tool part. The film is additionally elastically deformable relative to the contour surface by means of the first and/or the second clamping device in order to press the semi-finished product in a planar manner against the contour surface for deforming purposes.

According to a second aspect of the invention, a method is provided for producing a planar structural component for an aircraft. In this connection, a planar semi-finished product is placed onto a contour surface of a moulding tool part, wherein the semi-finished part is formed from a fibre-reinforced thermoplastic material.

In addition, the semi-finished product is covered with a film produced from an elastically deformable material, wherein the film is coupled to a first clamping device, which is arranged on a first longitudinal side of the contour surface of the moulding tool part, and to a second clamping device, which is arranged on a second longitudinal side of the contour surface of the moulding tool part, wherein the second longitudinal side is located opposite the first longitudinal side. The film is deformed elastically by means of the clamping devices in such a manner that the semi-finished product is pressed in a planar manner against the contour surface of the moulding tool part. In addition, the semi-finished product is heated to a temperature at which the thermoplastic material is thermoplastically deformable, preferably at the same time as the semi-finished product is pressed against the contour surface by the film. The temperature to which the thermoplastic material is heated can be a temperature within the flow temperature range of the respective thermoplastic material.

One of the ideas of the present invention consists in using a flexible, elastically deformable film for deforming the semi-finished product, by way of which film a semi-finished product placed on the contour surface of the moulding tool part is pressed against the contour surface in order to deform it into the desired form of the structural component. A more uniform pressure distribution is obtained on account of the elasticity of the film than when using a further, rigid moulding tool part. In addition, component tolerances which are produced from the introduction of heat can be compensated for in an efficient manner in this way, such that the structural component is able be produced with improved quality. A further advantage of using an elastic film for deforming the semi-finished product consists in that one and the same film can be used for different dimensioning of the contour surface of the moulding tool part and consequently for producing different component sizes. As a result, the method and the tooling device can be used flexibly, and planar structural components can be produced in an economically efficient manner.

A clamping system which comprises mechanical clamping devices is used according to an embodiment of the invention for deforming the film elastically. The clamping devices are each couplable to edge regions of the film. That is to say, the film is fastened mechanically, for example in a non-positive or positive locking manner, to the clamping devices. In addition, the clamping devices are arranged on oppositely situated sides or laterally of the contour surface so that the film coupled to the clamping device covers the contour surface, preferably completely. The clamping system is set up for the purpose of moving the film into contact with a semi-finished product arranged on the contour surface and thus of pressing the semi-finished product against the contour surface. To this end, the first and/or second clamping devices are set up for the purpose of moving the film in the direction of the contour surface. Clamping devices provide the advantage in this connection that they can be realized in a structurally simple manner and consequently in a cost-efficient manner. In addition, the clamping devices can be realized as components which are separate from the moulding tool part and can easily be exchanged without further changes to the moulding tool, as a result of which the flexibility of the tooling device is increased further.

The method according to an aspect of the invention can be carried out, in particular, by means of the tooling device according to an embodiment of the invention. The features and advantages described in conjunction with the tooling device consequently also apply in an analogous manner to the method and vice versa.

According to an embodiment of the tooling device, it is provided that the first and/or the second clamping device is realized as a clamping roll which is rotatable about a rotational axis which extends along the respective longitudinal side for the elastic deformation of the film. At least one, preferably both of the clamping devices can be realized, in this connection, as a type of roller, on which the film can be wound in order to deform it elastically relative to the contour surface. By the clamping rolls extending along the longitudinal sides of the contour surface, a particularly uniform pressure distribution is obtained along the longitudinal extension of the contour surface during the deforming of the semi-finished product.

According to a further embodiment, the contour surface is convexly curved between the first and the second longitudinal sides.

According to a further embodiment, the contour surface comprises longitudinal recesses for receiving stiffening structures realized on the semi-finished product. On the one hand, this facilitates the positioning of the semi-finished product on the contour surface. Furthermore, the processing of semi-finished products on which stiffening structures are already realized is simplified, in particular, in this manner.

According to a further embodiment, the first and the second longitudinal sides of the contour surface each comprise a length within a range of between 5 metres and 35 metres, in a preferred manner between 10 metres and 35 metres and in a particularly preferred manner between 10 metres and 30 metres. The tooling device is consequently set up, in particular, for the production of large structural components with lengths that are greater than or equal to 5 metres. The use of the elastically deformable film is particularly advantageous in said range of sizes of structural components as said film is able to compensate elastically for changes in the length of the semi-finished product or of the contour surface which occur as a result of the heating process during the production.

According to a further embodiment, the first and the second longitudinal sides are at a distance from one another within a range of between 1.5 metres and 4 metres.

The use of the elastically deformable film is particularly advantageous in said range of sizes of structural components as said film is able to compensate elastically for the changes in length of the semi-finished product or of the contour surface which occur as a result of the heating process during the production.

According to a further embodiment of the tooling device, it is provided that the heating device is realized as a planar heating mat which is dimensioned in such a manner that the contour surface of the moulding tool part is completely coverable with the heating mat. Accordingly, the semi-finished product can be completely covered by the heating mat when the semi-finished product is pressed against the contour surface by the film. Uniform planar heat input into the semi-finished product is consequently obtained.

According to an embodiment, the film is realized from a silicone material. Silicone materials provide the advantage of being mechanically and thermally robust with a high degree of elasticity.

According to an embodiment of the method, it is provided that a first side region of the semi-finished product, which is pressed against the contour surface of the moulding tool in the region of the first longitudinal side, and a second side region of the semi-finished product, which is pressed against the contour surface of the moulding tool in the region of the second longitudinal side, each comprise a length within a range of between 5 metres and 35 metres, in a preferred manner between 10 and 35 metres and in a particularly preferred manner between 10 and 30 metres.

With reference to directional specifications and axes, in particular to directional specifications and axes which refer to the progression of physical structures, a progression of an axis, a direction or a structure "along" another axis, direction or structure is to be understood herein in that they, in particular the tangents produced in a respective position of the structures, extend in each case at an angle of less than 45 degrees, in a preferred manner less than 30 degrees and in a particularly preferred manner parallel to one another.

With reference to the directional specifications and axes, in particular to directional specifications and axes which refer to the progression of physical structures, a progression of an axis, a direction or a structure "transversely" to another axis, direction or structure is to be understood herein in that they, in particular the tangents produced in a respective position of the structures, extend in each case at an angle of more than or equal to 45 degrees, in a preferred manner more than or equal to 60 degrees and in a particularly preferred manner perpendicularly to one another.

A "planar semi-finished product" is deemed herein in general to be a component which extends in a planar manner and is provided for realizing a structural component, in particular a component with a circumferential edge which connects two oppositely oriented main surfaces of the component, the circumferential edge comprising a surface with a negligible surface area compared to a surface area of the main surfaces.

A "fibre-reinforced thermoplastic material", a "thermoplastic fibre material" or a "thermoplastic fibre-reinforced composite" are to be understood herein in general as a material which is formed from a plurality of, in particular, fibre-shaped or filament-shaped stiffening fibres, such as, for example, carbon, glass, ceramic, aramid, boron, mineral, natural or plastics material fibres or mixtures formed from the same, the stiffening fibres being embedded in a resin or matrix material produced from a thermoplastic synthetic material.

BRIEF DESCRIPTION OF THE DRAWINGS

The invention is explained below with reference to the figures of the drawing, the figures are as follows.

The same reference symbols in the figures designate identical or operationally identical components, in so far as nothing to the contrary is specified.

DETAILED DESCRIPTION

Figure 4:
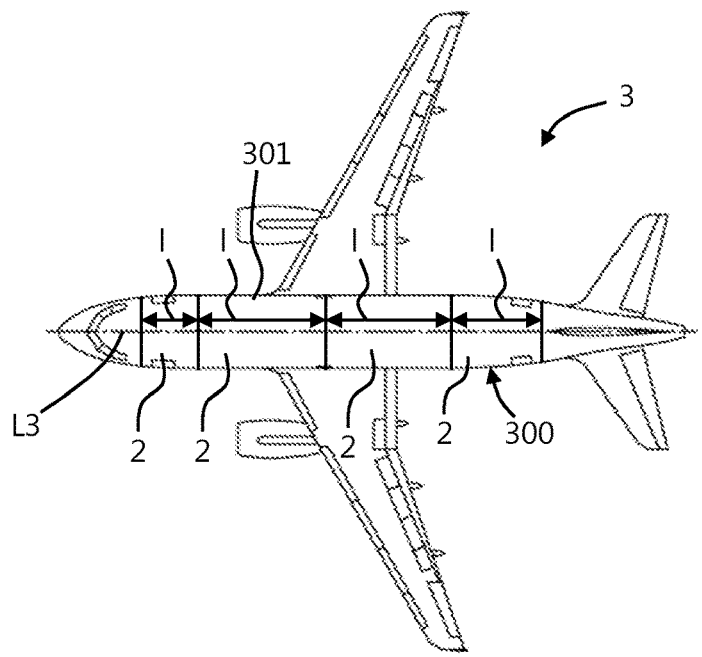
FIG. 4 shows a schematic representation of a top view of an aircraft which comprises structural components which are produced by the method according to an exemplary embodiment of the present invention.

FIG. 4 shows a top view of an aircraft 3 in a schematic manner. The aircraft 3 comprises a fuselage 300 which defines a longitudinal axis L3 of the aircraft. The fuselage 300 comprises an outer skin 301 which is composed of multiple structural components 2. The structural components 2 form outer skin segments and can, depending on the local cross sectional form of the fuselage 300, be realized, in particular, as half-shell-shaped components. FIG. 4 shows as an example that a top side of the outer skin 301 of a central fuselage region, with reference to the longitudinal axis L3 of the aircraft, is composed of a total of four structural components 2. These each comprise, in this connection, a length 1 within a range of between 5 metres and 35 metres, in particular between 10 metres and 35 metres.

Figure 1:
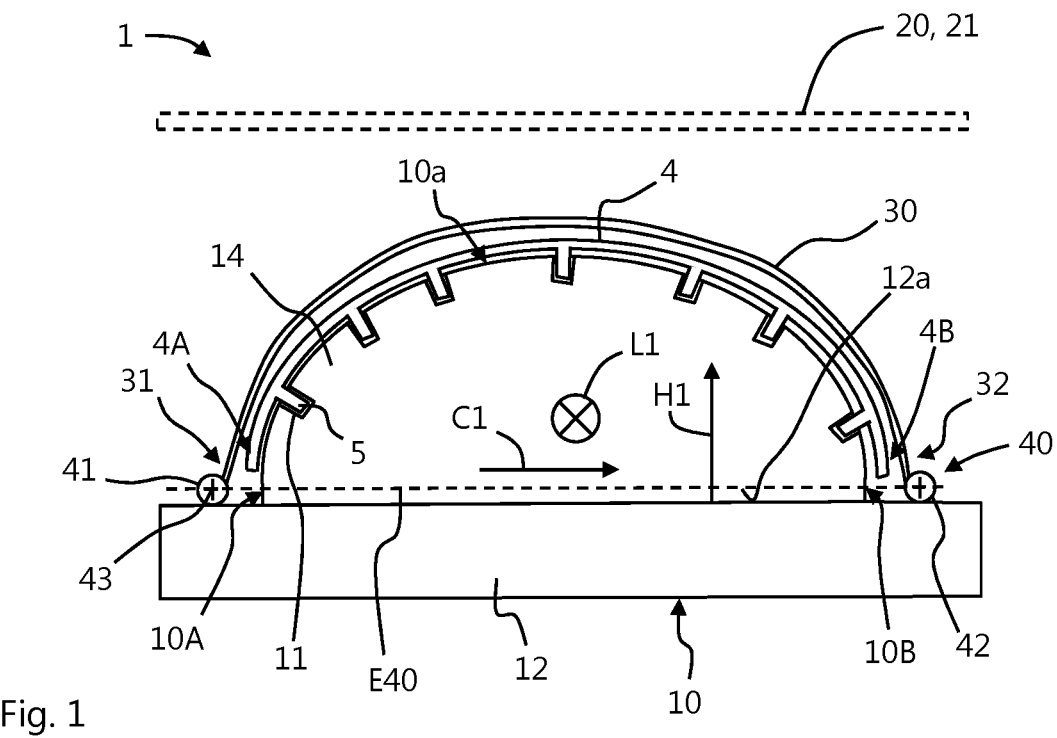
FIG. 1 shows a schematic sectional view of a tooling device according to an exemplary embodiment of the present invention during a step of a method according to an exemplary embodiment of the present invention.
Figure 2:
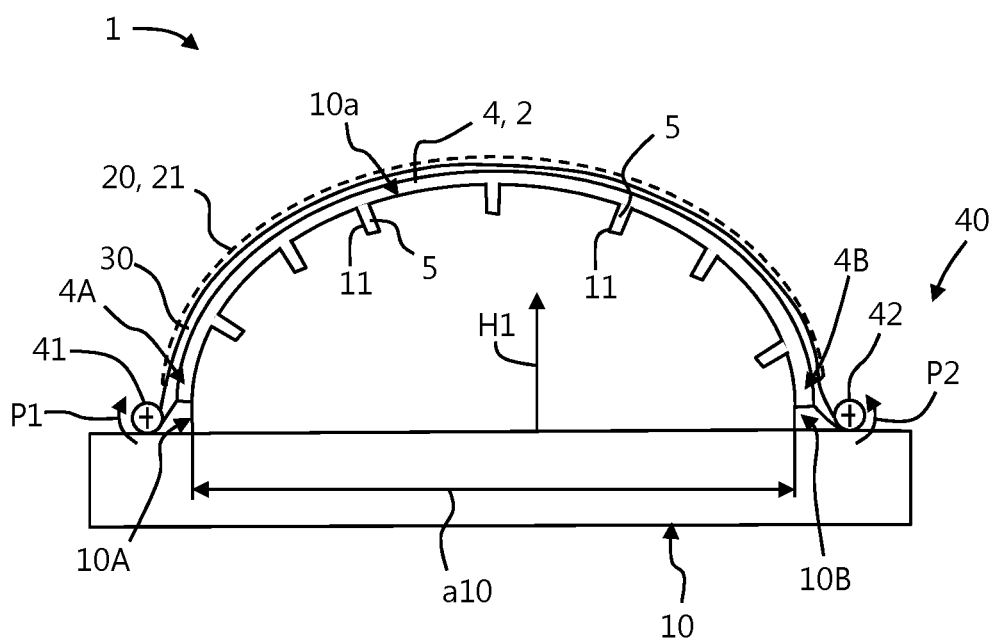
FIG. 2 shows the tooling device from FIG. 1 during a further step of the method.
Figure 3:
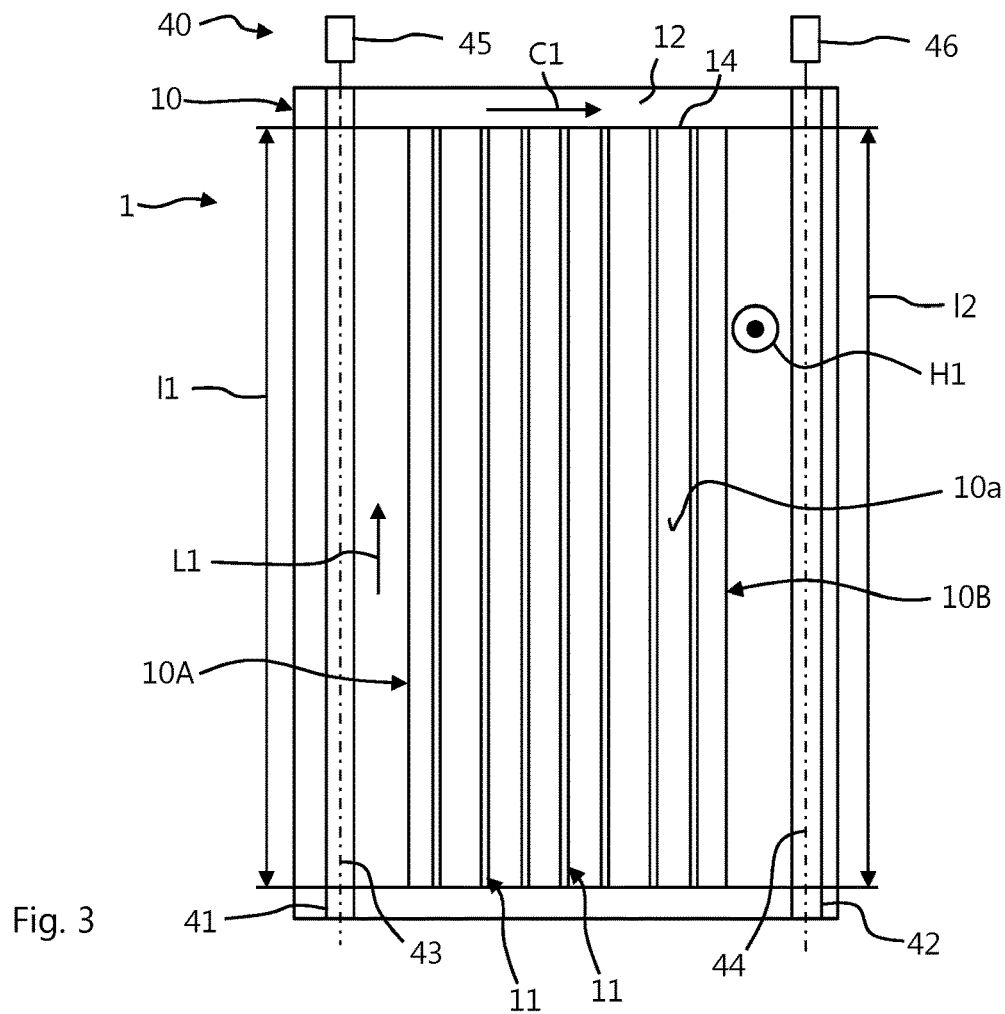
FIG. 3 shows a top view of a moulding tool part of the tooling device shown in FIG. 1.

FIGS. 1 to 3 show a tooling device 1 for producing the structural components 2. A method for producing the structural components 2 is also shown in FIGS. 1 and 2.

As shown in FIG. 1 as an example, the tooling device 1 comprises a moulding tool part 10, a heating device 20, a film 30 and a clamping system 40.

The moulding tool part 10 comprises a contour surface 10a, the surface progression of which corresponds to the form of the structural component 2 to be produced. The moulding tool part 10, shown as an example in FIG. 1, comprises a base part 12 in the form of a plate-shaped or block-shaped base and a moulded part 14 on which the contour surface 10a is realized. The moulded part 14 can be fastened, in particular, to the base part 12, as an option by means of a releasable connection, such as, for example, screws (not shown) or the like. As a result, different moulded parts 14, which each comprise contour surfaces 10a with different surface progressions, can be coupled advantageously to the base part 12. As an alternative to this, base part 12 and moulded part 14 can also be realized in one piece. Generally speaking, the moulded part 14 juts out from the base part 12.

As can be seen in FIG. 3, which shows a top view of the contour surface 10a, the contour surface 10a extends in a longitudinal direction L1 of the tool. In particular, the contour surface 10a comprises a first longitudinal side 10A, which extends along the longitudinal direction L1 of the tool, and a second longitudinal side 10B which also extends along the longitudinal direction L1 of the tool. The first and the second longitudinal sides 10A, 10B are placed opposite one another with reference to a transverse direction C1 of the tool which extends transversely to the longitudinal direction L1 of the tool. The first and the second longitudinal sides 10A, 10B of the contour surface 10a can each comprise a length 11, 12 within a range of between 10 metres and 35 metres along the longitudinal direction L1 of the tool. With reference to the transverse direction C1 of the tool, the first and the second longitudinal sides 10A, 10B are preferably arranged at a distance a10 from one another within a range of between 1.5 metres and 4 metres. As a result, relatively large, planar structural components 2 can be produced on the moulding tool part 10, as is explained again below in more detail.

As shown as an example in FIG. 1, the contour surface 10a can be curved, for example in a convex manner, between the first and the second longitudinal sides 10A, 10B. Generally speaking, the contour surface 10a protrudes in relation to a base surface 12a of the base part 12 in a vertical direction H1 of the tool which extends transversely to the base surface 12a or transversely to the longitudinal direction L1 of the tool. As is shown additionally in FIG. 2, the contour surface 10a comprises optional longitudinal recesses 11 which extend along the longitudinal direction L1 of the tool. As can be seen in FIG. 3, the optional longitudinal recesses 11 preferably extend over the entire length 11, 12 of the contour surface 10a.

As shown schematically in FIG. 1 and explained again below, the contour surface 10a serves for receiving and deforming a semi-finished product 4, from which a structural component 2 is produced. The optional longitudinal recesses 11 are provided for receiving stiffening structures 5, for example so-called stringers, which are realized on the semi-finished product 4.

The film 30 is dimensioned in such a manner that it is able to cover the contour surface 10a, preferably completely. The film 30 serves for pressing the semi-finished product 4 or for placing it flatly against the contour surface 10a. The film 30 is formed from an elastically deformable material, for example a silicone material.

As shown schematically in FIG. 1, the clamping system 40 comprises a first clamping device 41 and a second clamping device 42. The clamping devices 41, 42 are each arranged laterally of the contour surface 10a with reference to the transverse direction C1 of the tool. The first clamping device 41 is arranged on the first longitudinal side 10A of the contour surface 10a of the moulding tool part 10. The second clamping device 42 is arranged on the second longitudinal side 10B of the contour surface 10b. The clamping devices 41, 42 can be coupled, in particular, to the moulding tool part 10, for example fastened to or mounted on said moulding tool part. As shown as an example in FIGS. 1 to 3, the clamping devices 41, 42 can be arranged, in particular, on the base part 12. Generally speaking, the clamping devices 41, 42 are arranged in such a manner or can be arranged or moved in such manner that the contour surface 10a protrudes in part in relation to a plane E40, in which the clamping devices 41, 42 are arranged, at least with reference to the vertical direction H1 of the tool.

As shown as an example in FIGS. 1 to 3, the clamping devices 41, 42 can each be realized as a clamping roll, which clamping rolls are rotatable in each case about a rotational axis 43, 44 which extends along the respective longitudinal side 10A, 10B of the contour surface 10a or along the longitudinal direction L1 of the tool. As shown as an example in FIG. 3, the clamping rolls can each extend along the entire length of the contour surface 10a. As can also be seen in FIG. 3, driving devices 45, 46 are preferably provided for rotating the clamping rolls. A first driving device 45 for driving the first clamping device 41 and a second driving device 46 for driving the second clamping device 42 are provided, as an example, in FIG. 3. The driving devices 45, 46 can be realized, for example, as electric motors.

As can be seen in FIG. 1, the film 30 can be coupled by way of a first edge region 31 to the first clamping device 41 and by way of a second edge region 32 to the second clamping device 42. Eyelets (not shown) can be provided, for example, at the edge regions 31, 32 of the film 30, which eyelets, for coupling to the clamping devices 41, 42, are suspended in hooks (not shown) which are provided on said clamping devices. Other types of coupling, in particular of positive locking or non-positive locking coupling, can obviously also be provided. When the film 30 is coupled to the clamping devices 41, 42, the film 30 covers the contour surface 10a, as shown in FIG. 1. The clamping devices 41, 42 are set up for the purpose of moving the film 30 relative to the contour surface 10a, in particular for the purpose of moving the film 30 in the direction of the contour surface 10a. The film 30 is elastically deformable by means of the clamping devices 41, 42 in order to press the semi-finished product 4 in a planar manner against the contour surface 10a for deforming purposes. For example, the clamping devices 41, 42, which are realized as clamping rolls, can be rotated for this purpose about the rotational axes thereof 41, 42 so that the film 30 is wound onto the clamping rolls.

The heating device 20 serves for heating the planar semi-finished product 4. As shown schematically in FIGS. 1 and 2, the heating device 20 can be realized, in particular, as a planar heating mat 21. The heating mat is preferably dimensioned in such a manner that the contour surface 10a of the moulding tool part 10 is fully coverable with the heating mat 21, as shown as an example in FIG. 2.

A method for producing the planar structural components 2 for the aircraft 3 is explained below as an example with reference to the device described above.

First of all, a planar semi-finished product 4 is placed onto the contour surface 10a of the moulding tool part 10, as shown as an example in FIG. 1. The semi-finished product 4 is formed from a fibre-reinforced thermoplastic material. The semi-finished product 4 is already preformed in part as an option. The semi-finished product 4 comprises a first side region 4A and a second side region 4B which is located opposite said first side region. The first side region 4A is placed onto the contour surface 10a in the region of the first longitudinal side 10A. The second side region 4B is placed onto the contour surface 10a in the region of the second longitudinal side 10B. The side regions 4A, 4B of the semi-finished product 4 can each comprise a length with a range of between 5 metres and 35 metres, preferably between 10 metres and 35 metres. The optional stiffening structures 5 realized on the semi-finished product 4 are inserted into the optional longitudinal recesses 11 of the contour surface 10a.

As is also shown in FIG. 1, the semi-finished product 4 is covered by way of the film 30. The film 30 is coupled by way of its first edge region 31 to the first clamping device 41 and by way of its second edge region 32 to the second clamping device 42. The film 30 is then deformed elastically by means of the clamping devices 41, 42 in such a manner that the semi-finished product 4 is pressed in a planar manner against the contour surface 10a of the moulding tool part 10. For this purpose, the clamping devices 41, 42 are arranged in such manner or are movable in such a manner that the film 30 is moved in the direction of the plane E40. For example, one or both of the clamping devices 41, 42, which are realized as clamping rolls, are rotated about the respective rotational axis 43, 44 thereof, as shown schematically in FIG. 2 by the arrows P1 and P2. The direction of rotation shown schematically by the arrows P1 and P2 is, in this case, in such a manner that the film 30 is welded onto the clamping rolls. As a result, the amount of material of the film 30 which is located between the clamping devices 41, 42 with reference to the transverse direction C1 of the tool is reduced, the part of the film 30 which is located between the clamping devices 41, 42 is moved in the direction of the plane E40 and the film 30 is placed onto the semi-finished product 4. Consequently, the semi-finished product 4 is pressed firmly against the contour surface 10a and, as a result, receives the form provided by the contour surface 10a, as shown as an example in FIG. 2. As can be seen in FIG. 2, the first side region 4A of the semi-finished product 4 is pressed against the contour surface 10a of the moulding tool 10 in the region of the first longitudinal side 10A and the second side region 4B of the semi-finished product 4 is pressed against the contour surface 10a of the moulding tool 10 in the region of the second longitudinal side 10B.

Furthermore, the semi-finished product 4 is heated by means of the heating device 20 to a temperature at which the thermoplastic material is thermoplastically deformable. For this purpose, for example, the heating device 20, which is realized as a heating mat 21, can be placed onto the film 30, as is shown schematically in FIG. 2. As an option, the heating mat 21 can also be placed directly onto the semi-finished product 4 before it is covered by means of the film 30. As a result of heating the thermoplastic material, for example to a temperature within the flow temperature range of the material, said thermoplastic material becomes plastically deformable and, as a result, receives the form of the contour surface 10a due to the forces exerted by the film 30.

In particular, large, planar structural components 2 with a length within a range of between 5 and 35 metres can be produced efficiently in this manner. Due to the elasticity of the film 30, it is easily possible to compensate for changes in length which arise as a result of the heating process. Furthermore, it is also possible to produce structural components 2 with different forms with one and the same film 30. Deforming the film 30 elastically by means of a mechanical clamping system provides the tooling device 1, in particular, with a structurally simple design.

Although the present invention has been explained above as an example by way of exemplary embodiments, it is not restricted to said exemplary embodiments, but can be modified in a versatile manner. In particular, combinations of the aforementioned exemplary embodiments are also conceivable.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCES

1 Tooling device
2 Structural component
3 Aircraft
4 Semi-finished product
4A First side region of the semi-finished product
4B Second side region of the semi-finished product
5 Stiffening structures
10 Moulding tool part
10a Contour surface
10A First longitudinal side of the contour surface
10B Second longitudinal side of the contour surface
11 Longitudinal recesses
12 Base part
12a Base surface
14 Moulded part
20 Heating device
30 Film
31 First edge region of the film
32 Second edge region of the film
40 Clamping system
41 First clamping device
42 Second clamping device
43 Rotational axis of the first clamping device
44 Rotational axis of the second clamping device
45 First driving device
46 Second driving device
300 Fuselage

301 Outer skin
a10 Distance between the first and the second longitudinal sides
C1 Transverse direction of the tool
E40 Plane
H1 Vertical direction of the tool
1 Length of the structural component
L1 Longitudinal direction of the tool
11 Length of the first longitudinal side
12 Length of the second longitudinal side
L3 Longitudinal axis of the aircraft
P1, P2 Arrows

The invention claimed is:

1. A tooling device for producing a planar structural component for an aircraft, comprising:
 a moulding tool part comprising a contour surface for receiving a planar semi-finished product;
 a heating device for heating the planar semi-finished product;
 a film produced from an elastically deformable material; and
 a clamping system with a first clamping device arranged on a first longitudinal side of the contour surface of the moulding tool part, and a second clamping device arranged on a second longitudinal side of the contour surface of the moulding tool part located opposite the first longitudinal side;
 wherein a first edge region of the film is couplable to the first clamping device and a second edge region of the film is couplable to the second clamping device; and
 wherein the film, when coupled to the clamping devices, covers the contour surface of the moulding tool part and is elastically deformable relative to the contour surface by the first and/or the second clamping device in order to press the semi-finished product in a planar manner against the contour surface for deforming purposes.

2. The tooling device according to claim 1, wherein the first and/or the second clamping device comprises a clamping roll rotatable about a rotational axis, the rotational axis extending along a respective longitudinal side of the contour surface, for the elastic deformation of the film.

3. The tooling device according to claim 1, wherein the contour surface is convexly curved between the first and the second longitudinal sides.

4. The tooling device according to claim 1, wherein the contour surface comprises longitudinal recesses for receiving stiffening structures which are realized on the semi-finished product.

5. The tooling device according to claim 1, wherein the first and the second longitudinal sides of the contour surface each comprise a length within a range of between 5 metres and 35 metres.

6. The tooling device according to claim 1, wherein the first and the second longitudinal sides are at a distance from one another within a range of between 1.5 metres and 4 metres.

7. The tooling device according to claim 1, wherein the heating device comprises a planar heating mat dimensioned in such a manner that the contour surface of the moulding tool part is completely coverable with the heating mat.

8. The tooling device according to claim 1, wherein the film comprises a silicone material.

* * * * *